United States Patent [19]
Honda et al.

[11] 3,855,573
[45] Dec. 17, 1974

[54] APPARATUS FOR PREVENTING A DRUNKEN DRIVER FROM OPERATING A MOTORCAR

[75] Inventors: Soichiro Honda; Yasuo Satoh, both of Tokyo, Japan

[73] Assignee: Honda Giken Kogyo Kabushiki Kaisha, Tokyo, Japan

[22] Filed: Oct. 26, 1972

[21] Appl. No.: 300,997

[52] U.S. Cl.................... 340/53, 340/279, 180/99
[51] Int. Cl............................................. B60r 27/00
[58] Field of Search........ 340/52 R, 53, 237 R, 279; 180/82.7, 99; 128/2 C; 73/421.5 R

[56] References Cited
UNITED STATES PATENTS
| | | | |
|---|---|---|---|
| 3,186,508 | 6/1965 | Lamont | 180/99 |
| 3,238,783 | 3/1966 | Wright | 73/421.5 R |

Primary Examiner—Alvin H. Waring
Attorney, Agent, or Firm—Waters, Roditi, Schwartz & Nissen

[57] ABSTRACT

An apparatus for preventing a drunken driver from operating a motor vehicle in which a suction pipe is connected at one end to a pump and its other end is open and faces into the interior of the passenger compartment of the vehicle so as to constitute a suction device for sucking air thereinto adjacent the driver's seat. A detecting device is also mounted in the passenger compartment for detecting the alcohol content in the air flowing through the suction pipe and upon operation of the detecting device due to the presence of excess alcohol, the vehicle is rendered inoperative. The apparatus may also include a sensing device for detecting pressure change within the suction pipe to render the vehicle inoperative due to excess pressure change.

8 Claims, 3 Drawing Figures

PATENTED DEC 17 1974  3,855,573

APPARATUS FOR PREVENTING A DRUNKEN DRIVER FROM OPERATING A MOTORCAR

BRIEF SUMMARY OF THE INVENTION

The invention relates to apparatus for preventing the operation of a motor vehicle by a drunk driver.

Traffic accidents have become a great social problem and, among those, accidents caused by drunk drivers are especially numerous. However an effective apparatus for preventing such kinds of accidents has not yet been developed.

An object of this invention is to provide a novel and simple apparatus for preventing the operation of a motorcar by a drunk driver, i.e., a person who is intoxicated. The invention is characterized by the combination of a suction pipe connected at one end to a pump and open at its other end into the interior of the passenger compartment of the vehicle so as to constitute a suction device for sucking the air adjacent the driver's seat, and a detecting device for detecting the alcohol content contained in the air flowing through the suction pipe so that by operation of the detecting device the vehicle is rendered inoperative.

DETAILED DESCRIPTION

Figure 1:
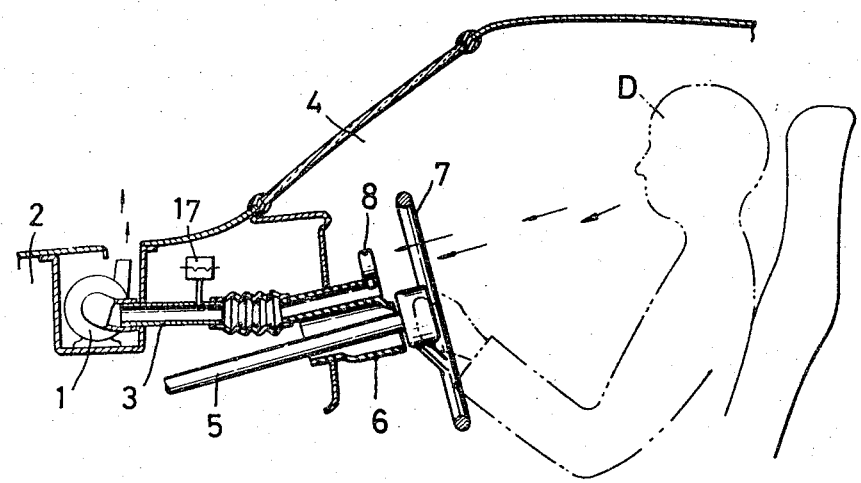
FIG. 1 is a side view of the apparatus according to this invention in section.
Figure 2:
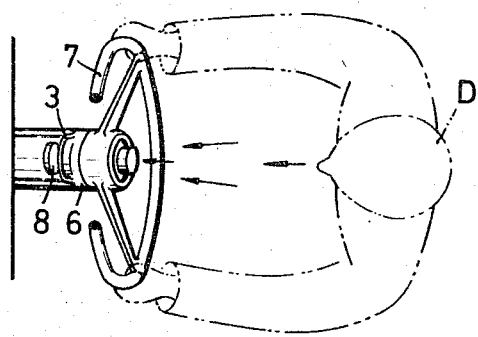
FIG. 2 is a top plan view of a portion thereof.

In FIGS. 1 and 2 numeral 1 denotes a pump mounted, for example, within the engine compartment 2 of a vehicle and numeral 3 denotes a suction pipe which is connected at one end to the pump 1, the pipe 3 being open at its other end and exposed to the interior of a passenger compartment 4 for sucking the air in front of the driver's seat. The pipe 3 is supported by a housing 6 of a steering column 5 such that the open end of the pipe 3 is located near the center of steering wheel 7. Numeral 8 denotes a detecting device for detecting the alcohol content in the air flowing in the suction pipe 3. The detecting device 8 may be, for example, a combustible gas detecting device in which a combustible gas is burnt when brought into contact with a heated platinum filament to cause an electrical resistance change by increase of the temperature of the filament by such burning. Such combustible gas detecting devices are well known in the art and by way of example, reference is made to U.S. Pat. No. 3,507,145 which shows one such operative device.

Figure 3:
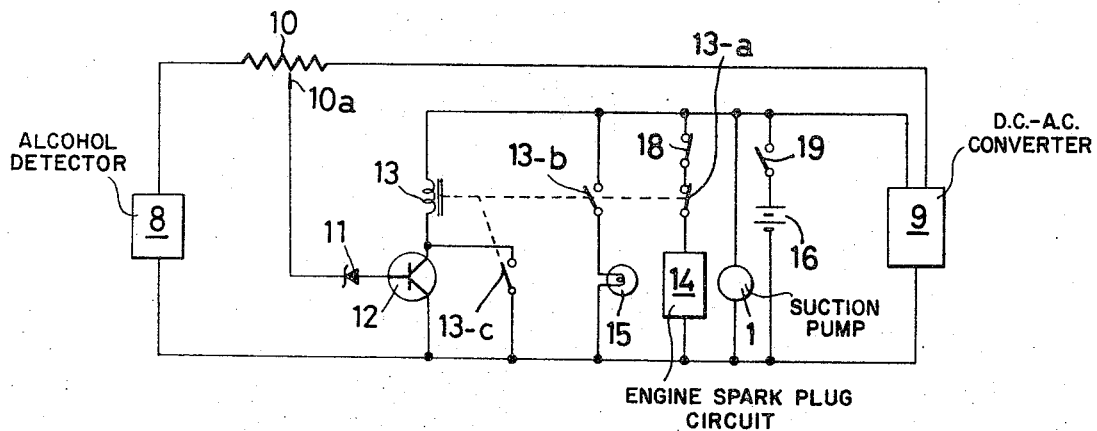
FIG. 3 is a control circuit diagram.

FIG. 3 shows a control circuit adapted to be operated by the presence of an output signal of the detecting device 8 to render the vehicle inoperative In the circuit, a variable resistance 10 and the detecting device 8 are connected in series with an electric power source including battery 16 and a DC-AC convertor 9 and a movable member 10a of the variable resistance 10 is connected to the base terminal of a switching transistor 12 through a Zener diode 11. Relay contacts 13a, 13b of a relay 13 interposed in a collector circuit of the transistor 12 are interposed in an engine spark plug circuit 14 and an indication lamp 15 circuit, respectively.

If, now, a driver sits on the driver's seat and closes main ignition switch 19, the pump 1 is operated in conjunction therewith and thereby the breath exhaled by the driver is drawn into the suction pipe 3. Accordingly, if the alcohol content in the breath of the driver exceeds a pre-determined value corresponding to intoxication, the electric resistance of the detecting device 8 will change and the voltage across the same vary correspondingly to cause the potential of the movable member 10a to exceed the Zener voltage of the Zener diode 11. Then, the transistor 12 is switched "on" to operate the relay 13, whereby the ordinarily closed contact 13a is opened to disconnect the spark plug circuit 14 and electric source 16. Thereby spark plug firing is not possible and the vehicle is rendered inoperative. At the same time the ordinarily open contact 13b is closed and thereby the lamp 15 is lit to indicate that the driver is drunk. Since the relay 13 is self-held by closing of a contact 13c, when a person who is not drunk intends to drive the car, the main switch 19 must be opened once. Thereby, the relay 13 becomes inoperative and the spark plug circuit 14 is closed. Accordingly, when the main switch 19 is again closed, the motorcar can be driven.

For operating the foregoing apparatus more effectively, it is desirable that the vehicle remain inoperative even when the foregoing detecting device is made inoperative intentionally by closing the inlet opening of the suction pipe 3. For this purpose, this invention contemplates a device 17 for detecting a pressure change within the suction pipe 3, for example a device utilizing a diaphragm for detecting an excess pressure change, such that upon operation of the detecting device 17, an ordinarily closed switch 18 interposed in the engine spark plug circuit 14 is opened. Accordingly, if the inlet opening of the suction pipe 3 is closed by the drunk driver, the pressure within the suction pipe 3 is suddenly lowered and by the operation of the device 17 (which has detected this pressure change) the switch 18 is opened and thereby engine spark plug firing is not possible. Additionally, if the discharge opening of the suction pipe 3 is closed, the pressure within the pipe 3 is increased and thereby the detecting device 17 is also operated.

The apparatus according to this invention thus renders a motorcar inoperative when a drunk driver attempts to drive the motorcar. The air in the vicinity of the driver's seat is immediately suctioned by the pump 1 and the air is inspected by the alcohol content detecting device 8, so that the intoxicated condition of the driver can be rapidly detected and prevent any drunken driving resulting from a delay in alcohol detection. Furthermore, even if the drunk driver attempts to cover the alcohol detecting device 8 so that his breath will not be detected by the detecting device 8, the motorcar will still be rendered inoperative, this being due to the construction whereby the inlet of the device 8 is open into tube 3.

What is claimed is:

1. Apparatus for preventing operation of a vehicle by a drunken driver, the vehicle having an electrical power source and an ignition switch, said apparatus comprising a suction pipe having an inlet end which opens into the interior of a passenger compartment of the vehicle and faces the driver's seat of the vehicle, said suction pipe having an opposite end remote from said inlet end, a suction motor connected to said opposite end of said pipe, said suction motor being electrically connected to the electrical power source of the vehicle through the ignition switch whereby the suction motor is operable independently of the operation of the engine of the vehicle, detecting means for detecting the alcohol content in the air flowing in the suction pipe, further means coupled to the detecting means to render the vehicle inoperative when the detecting means senses the presence of alcohol in excessive amount and means for sensing pressure change in said suction pipe for rendering the vehicle inoperative upon excess pressure change.

2. Apparatus as claimed in claim 1 wherein said inlet of the suction pipe is positioned directly in front of the driver's seat.

3. Apparatus as claimed in claim 2 wherein the suction inlet is positioned adjacent the steering wheel of the vehicle.

4. Apparatus as claimed in claim 1 wherein said further means comprises a control circuit containing said detecting means and an ignition circuit of the vehicle, and means for opening the ignition circuit when the detecting means senses excess alcohol.

5. Apparatus as claimed in claim 1 wherein the detecting means includes a detecting device having an electrical resistance which is a function of the alcohol content which is sensed.

6. Apparatus as claimed in claim 5 wherein the control circuit includes a normally inactive voltage-sensitive arrangement connected in series with said detecting device and rendered active when the detecting device senses an excess alcohol content, said arrangement being coupled to the means which opens the ignition circuit to effect such opening when the arrangement is operative.

7. Apparatus as claimed in claim 6 wherein said control circuit includes an indicator lamp connected to the voltage-sensitive arrangement for being rendered operative when the latter arrangement is operative.

8. Apparatus as claimed in claim 6 wherein said voltage-sensitive arrangement includes a variable resistor connected in series with the detecting device, a Zener diode connected to said variable resistor and a relay in circuit connection with the Zener diode to open the ignition circuit of the vehicle.

* * * * *